US012286313B2

United States Patent
Biondi et al.

(10) Patent No.: US 12,286,313 B2
(45) Date of Patent: Apr. 29, 2025

(54) TRANSFER APPARATUS AND PROCESS

(71) Applicant: G.D S.P.A., Bologna (IT)

(72) Inventors: Andrea Biondi, Bologna (IT); Luca Cavazza, Bologna (IT); Umberto Zanetti, Bologna (IT); Enrico Campagnoli, Bologna (IT); Antonio Gigante, Bologna (IT); Giacomo Noferini, Bologna (IT); Cristian Dakessian, Bologna (IT)

(73) Assignee: G.D S.P.A., Bologna (IT)

( * ) Notice: Subject to any disclaimer, the term of this patent is extended or adjusted under 35 U.S.C. 154(b) by 33 days.

(21) Appl. No.: 17/998,649

(22) PCT Filed: Jul. 26, 2021

(86) PCT No.: PCT/IB2021/056713
§ 371 (c)(1),
(2) Date: Nov. 11, 2022

(87) PCT Pub. No.: WO2022/023928
PCT Pub. Date: Feb. 3, 2022

(65) Prior Publication Data
US 2023/0348205 A1 Nov. 2, 2023

(30) Foreign Application Priority Data
Jul. 31, 2020 (IT) .................... 102020000018820

(51) Int. Cl.
*B65G 47/86* (2006.01)
(52) U.S. Cl.
CPC .... *B65G 47/847* (2013.01); *B65G 2201/0258* (2013.01); *B65G 2201/0261* (2013.01); *B65G 2201/027* (2013.01)

(58) Field of Classification Search
CPC .......... B65G 47/847; B65G 2201/027; B65G 2201/026; B65G 2201/025; B23Q 7/048;
(Continued)

(56) References Cited

U.S. PATENT DOCUMENTS

| 5,683,729 A * | 11/1997 | Valles ............... B29C 49/42122 425/534 |
| 10,384,819 B2 * | 8/2019 | Baraccani ............... B65B 57/14 |
| 2022/0031122 A1 * | 2/2022 | He .......................... A47J 44/00 |

FOREIGN PATENT DOCUMENTS

| EP | 3239079 A2 | 11/2017 |
| EP | 3012088 | * 3/2019 |

(Continued)

OTHER PUBLICATIONS

International Search Report and Written Opinion for International Application No. PCT/IB/2021/056713 filed on Jul. 26, 2021 on behalf of G.D S.P.A. Mail Date: Oct. 21, 2021, 12 pages.

*Primary Examiner* — Gene O Crawford
*Assistant Examiner* — Lester Rushin, III
(74) *Attorney, Agent, or Firm* — Steinfl + Bruno LLP (57) ABSTRACT

An apparatus and a transfer process for articles are presented. The articles are transferred without risk of damage when gripped by pincer grip devices, regardless of article shape and gripping manner. The apparatus includes a first transport device, having pincer grip devices, moving along a first closed path, each having pincer claws projecting outward from the first closed path. The pincer claws are movable from a gripping position to a release position. The apparatus also includes a second transport device, having tray-like elements moving along a respective second closed path and configured to receive respective articles resting thereon. The first and second transport devices cooperate with each other at one or two exchange segments where the first closed path is superimposed on said second closed path
(Continued)

and where the articles transported in the pincer grip devices are laid on tray-like elements and/or removed therefrom.

14 Claims, 6 Drawing Sheets

(58) Field of Classification Search
CPC ........ B23Q 7/48; B23Q 7/05; B29C 49/4205; B29C 49/42073
See application file for complete search history.

(56) References Cited

FOREIGN PATENT DOCUMENTS

| | | |
|---|---|---|
| JP | H07 97044 A | 4/1995 |
| WO | 2010/013200 A2 | 2/2010 |
| WO | 2014/040960 A1 | 3/2014 |

\* cited by examiner

Fig. 8

TRANSFER APPARATUS AND PROCESS

CROSS REFERENCE TO RELATED APPLICATIONS

The present application is the U.S. National Stage Entry of International Patent Application No. PCT/IB2021/056713, filed on Jul. 26, 2021, which in turn, claims priority to Italian Application No. IT 102020000018820, filed on Jul. 31, 2020.

FIELD

The present invention relates to a transfer apparatus and a transfer process for articles to be packaged, in which gripping devices are used, and which find their preferred application in an apparatus and in a packaging process.

The present invention finds a preferred, though not exclusive, application in the field of packaging capsules for products by infusion, for example coffee, a field to which reference may be made hereafter without loss in generality.

BACKGROUND

In particular, in the relevant technical field, transfer devices are known for gripping and transferring articles of various kinds, taking into account their shape and their intrinsic fragility, which prevents the use of pincers that exert a too tight grip.

For example, in the case of capsules for infusion type products, the article to be gripped has a flared cup shape, i.e. truncated conical, with a diameter that varies according to the height.

The material that makes up the capsule, if grasped with an excessive grip, could break, or deform, causing potential damage to the content of the capsule itself.

This need to handle the articles to be gripped and transferred with a certain level of delicacy must be combined with the need to move the articles continuously and at high speed, ensuring a high flow rate of articles.

DEFINITIONS

In this description and in the accompanying claims as well, certain terms and expressions are deemed to have, unless otherwise expressly indicated, the meaning expressed in the following definitions.

Herein and in the following, an article is defined as an element formed substantially by a single piece that must be transported individually at high speed, with the final aim of transferring it from one packaging station to the subsequent one.

In particular, it is envisaged that these discrete elements, downstream of any machining or extraction process or even pre-forming, are fed onto lines of discrete elements, through which a predetermined spacing between the discrete elements is achieved, allowing the intervention of tools, none of them interfering with discrete elements not being of their competence.

By way of example, an article may consist of a capsule which, in its most general form, comprises an outer casing shaped like a cup, with a truncated cone-shaped flaring of the lateral wall thereof, a bottom and an upper opening, with a content which, by way of example, could include a powder or granulate of an infusion type product, such as a powder or a coffee-based preparation.

This article therefore constitutes the semi-finished product in order to obtain the final product, i.e. an infusion type capsule that can be used in an infuser device.

Considering that the coffee preparation has been placed in a precise quantity in the capsule, and considering that the capsule may also contain an internal filter, which is connected to the internal surfaces of the capsule, the article requires to be handled with a certain delicacy and that its position remains fixed, i.e. upright vertically on the bottom, because any inclination or jolting could cause part of the internal preparation to come out.

Therefore, during the transfer the article must be translated without changing its upright position and without shaking or deforming it.

It is understood that these articles are transported continuously when they move with a predetermined speed, possibly variable, i.e. subject to accelerations and decelerations, but never nihil. Continuous feeding and transport are therefore distinguished from step feeding and transport, in which the corresponding articles move in jerks.

"Capsule" means a hollow article of round or cylindrical shape intended to form a container, a casing, with a product in its inside, thus possessing a predetermined shape, in which a head and a bottom are identified, and for which it is provided that it is arranged in an upright vertical arrangement with the head facing upwards, which in turn has an opening that can be sealed by a lid at the end of the packaging process.

The capsules will have a substantially truncated conical or truncated pyramidal shape, or equivalent shapes, and the diameter of a section thereof, executed in a plane orthogonal to the longitudinal axis thereof, or the perimeter of such a section equivalent to the diameter, varies with the variation of the position of the section plane along the axis itself, that is with the variation of the spacing between the bottom and the level at which the capsule is graspend by a pincer.

Feeding or transport "in a line" means that discrete articles are supplied in a sequence of articles, which is part of a transfer step.

It is understood that in the line, each article is spaced from the articles preceding and following it with a spacing that may vary during the transfer itself.

"Gripping device", in particular of the pincer type, also referred to briefly as "pincer device", means a device comprising a pair of jaws or claws which move, by translating and/or rotating, from a gripping or grasping configuration, in which they grip and grasp the article between them, to a release configuration, in which they move apart.

"Transport system" or "transport device" means any system designed to transport articles while maintaining their respective singularity, i.e. without them interfering with each other in any way. The same concept also applies to the cup-shaped containers.

"Transport path" refers to the path that is travelled by articles and support devices intended to grip or receive a respective article individually.

The term "closed transport path" means a transport path that develops along a closed line on a substantially horizontal plane, while the term "carousel structure" means a transport device that operates on a closed transport path, letting the articles and the respective pincer devices, or in any case the movable devices therein provided, carry out a so called revolution which, for this reason, should not be confused with the alternated roundtrip motion that is typical for a belt conveyor.

"Transfer apparatus" means an apparatus that is provided to transport articles in a packaging apparatus, moving them from one process station to a subsequent process station, where operations concerning the packaging of the article, i.e. the production thereof, are carried out.

"Transfer device" means a device, operating in a transfer apparatus, which is provided to transport articles in a sequence, belonging to a flow of articles, from a gripping segment to a release segment.

"Gripping segment" and "release segment" mean two respective portions of a closed transport path of gripping devices, in particular gripping devices, in which a respective gripping or grasping location and a respective release location are contained.

By "exchange segment" it is generically understood as either a gripping segment or a release segment.

"Transfer wheel" means a device having a carousel structure on the periphery of which transport elements, which may be pincer or tray-like devices, are moved, each provided for the transport of one or more articles.

SUMMARY

The Applicant noted that, in packaging processes, the speed of transfer of the articles is crucial to the overall economics of the process, as high production volumes can be achieved with fewer packaging apparatuses.

Furthermore, the Applicant observed that, in addition to the need to proceed as quickly as possible, another important and unavoidable requirement is represented by the fragility of the article being transferred, which may have to be discarded if it is damaged, or if the content thereof is altered or ejected even in small parts.

Furthermore, neither can the need for flexibility be neglected, which requires that in the packaging apparatus the transfer of articles of different shapes, or of shapes that have irregularities, such as a diameter that varies with the height of the article, is ensured.

These needs are particularly felt at high transfer speeds, when precise and correct positioning of the articles in the target positions represent a critical factor for the economy of the production process.

Furthermore, this need is reinforced when, in a packaging machine, an increase in the process speed is required and which must be managed without any inconvenience or error.

In addition, the apparatus must also be able to manage articles of different formats, without requiring interventions in the packaging apparatus.

The Applicant also verified that the continuous transfer of articles enables achieving the productivity rates required for this type of apparatus in a packaging apparatus, leading to a reduction in feeding and passage times.

The Applicant found that, in general, the intervention on the movement of the claws of the pincer-type device represents a promising starting point for the realisation of a pincer device and of a transfer apparatus capable of meeting the above requirements.

The Applicant, however, understood that this requirement is manifested both in the continuous transfer and also in step advancement, and especially in high-speed transfer this problem requires the adoption of appropriate measures to achieve an adequate handling of the articles.

The Applicant therefore realised that the adoption of particular characteristics, useful for handling the articles without damaging them, can possibly be exploited to grasp, in a single grip, even more than one article, increasing the capacity of the transfer flow without having to proportionally accelerate the transfer speeds of the single articles.

The Applicant therefore perceived that the adoption, in the gripping device, of claws capable of rotating around a longitudinal rather than transversal axis with respect to the device may make the grasping gentler, but also insensitive to the small variations in diameter that might depend on a different gripping height.

The Applicant finally found that, by rotating the claws around axes that are located on or are parallel to the gripping plane, it is possible to achieve both the delicacy in handling the articles and the flexibility required.

In particular, in a first aspect thereof, the invention relates to a transfer apparatus for articles.

Preferably, the transfer apparatus comprises at least a first transport device.

Preferably, said at least one first transport device has a plurality of gripping devices, in particular of the pincer type, movable along a respective first closed path.

Preferably, each gripping device has respective pincer claws projecting outward said closed path, moving from a gripping position, in which they transport one or more articles, to a release position.

Preferably, the transfer apparatus comprises at least a second transport device.

Preferably, said at least one second transport device has a plurality of tray-like elements moving along a respective second closed path apt to receive respective articles resting thereon.

Preferably, the first and second transport devices cooperate with each other at one or two exchange segments, wherein the first closed path is superimposed on said second closed path, and wherein the articles, which are transported in said gripping devices, are laid on respective tray-like elements and/or removed therefrom.

Thanks to these features, it is possible to create a transfer apparatus in which the articles being transferred do not risk receiving any kind of damage when gripped by the gripping devices, regardless of the shape of the article and the way in which it is gripped.

Moreover, again thanks to these characteristics, the gripping devices of the transfer apparatus and the tray-like elements can be arranged, on the respective transfer devices, in compact configurations which involve a reduced footprint for the same number of articles being transported.

In a second aspect thereof, the invention relates to a transfer process for articles.

Preferably, at least a first transport device is provided in the aforesaid method.

Preferably, said at least one first transport device has a plurality of gripping devices, in particular of the pincer type, movable along a respective first closed path.

Preferably, each gripping device has respective pincer claws projecting outward said closed path, moving from a gripping position, in which they transport one or more articles, to a release position.

Preferably, at least a second transport device is provided in the aforesaid method.

Preferably, said at least one second transport device has a plurality of tray-like elements moving along a respective second closed path apt to receive respective articles resting thereon.

Preferably, the process comprises a step in which the first and second transport devices cooperate with each other at one or two exchange segments, wherein the first closed path is superimposed on said second closed path, and wherein the articles, which are transported in the gripping devices, are laid on respective tray-like elements and/or removed therefrom.

In other words, in the aforesaid method the passage between the pincer and the respective tray-like element takes place without unwanted crushing or shaking of the article to be packed.

In a third aspect thereof, the present invention relates to a packaging apparatus comprising a transfer apparatus for articles in accordance with the first aspect of the invention as outlined above.

In other words, this packaging apparatus can benefit from a greater compactness of the transfer apparatus, and a reduction in articles that suffer any damage during transfer.

In at least one of the aforesaid aspects, the present invention may further comprise at least one of the following preferred features.

Preferably, said first closed path is a circular path, providing the apparatus with greater constructional simplicity.

Preferably, said first transport device comprises a respective carousel-like transfer wheel.

Preferably, said transfer wheel comprises a first drum on the periphery of which said gripping devices are arranged in a sequence.

Preferably, the pincer claws project outward in a substantially radial direction from the circular path.

In this way, the structural simplicity of the apparatus is combined with an easy synchronization of its parts.

Preferably, said second closed path is a circular path, again providing the apparatus with greater constructive simplicity.

Preferably, said at least one second transport device comprises a respective carousel-like transfer wheel comprising a second drum on the periphery of which said tray-like elements are arranged in a sequence.

In this way, as described above, the structural simplicity of the apparatus is combined with easy synchronisation of its parts.

Preferably, each gripping device comprises a pair of mutually cooperating gripping claws, each having a proximal end and a distal end, a gripping edge facing the gripping edge of the other gripping claw.

Preferably, each pincer claw has a longitudinal development following a predefined respective direction, and the predefined directions of the two pincer claws of the pincer device define a gripping plane.

Preferably, each gripping device comprises a driving mechanism which in turn comprises at least one rotary actuator, connected to a respective proximal end of each gripping claw.

Preferably, the rotary actuator is provided to rotate each gripping claw from a gripping position to a release position about a rotation axis.

Preferably, the rotation axes and the aforesaid directions of longitudinal development of the claws are parallel to each other.

Preferably, in the gripping position, the gripping edges have a minimum spacing which increases in said release position.

In this way, the single gripping device is particularly compact and can therefore be provided in greater number for the same size of the respective transfer device.

In addition, the grip of the pincer device is gentle, so that the gripped articles do not risk being damaged.

Preferably, each gripping claw rotates in a direction opposite to that of the other gripping claw, ensuring that the pincer device opens as wide as possible with the same width of the gripping claws.

Preferably, each pincer claw rotates shifting downwards, ensuring a drop release precisely within the target location of the corresponding tray-like element.

Preferably, each rotary actuator comprises, for each gripping claw, a rotary pin defining a respective rotation axis which extends in a direction concordant with the predefined direction of development of the claws.

In this way, each claw does not rotate about an axis that is perpendicular to the plane on which they are located, i.e. about a rotation pin that is perpendicular to their development, as happens in a classic jaw pincer configuration.

Instead, each claw rotates about a longitudinal axis with respect to the extension of the claws, obtaining a considerable reduction of the overall dimensions for each pincer device.

In particular, the direction of longitudinal development of the claws and their rotation axis are substantially parallel or diverge by a minimum angle.

The minimum angle is defined as an angle such that, when the two claws are raised and approached in the gripping position, they are at the shortest spacing from each other, which increases progressively as the claws are rotated substantially around themselves.

Preferably, each pincer device is provided for gripping and releasing two or more articles, arranged along a line that projects outward the respective first closed path.

Preferably, the tray-like elements comprise corresponding two or more seats, each one apt to receive one article which, in either the exchange segment or segments, are aligned and parallel with the articles on the gripping devices with which they cooperate.

In this way, the flow rate of the transferred articles can be doubled with the same overall dimensions.

Preferably, the tray-like elements each have one or more recesses defining a respective support seat for one article in a predetermined position.

Thanks to this expedient, the position of the articles in the tray-like elements is precise, predictable and repeatable.

Preferably, the tray-like elements are mounted on a member rotating about a vertical axis, thereby the support seats of each tray-like element in said exchange segment are aligned along a direction substantially perpendicular to the second closed path, and they can be a direction substantially parallel with or tangential to said second closed path.

In this way, the flow of articles, from a flow on two concentric circular lines, changes to a flow on a single line, allowing the articles to be operated individually, one at a time.

Preferably, support seats of each tray-like element, in said exchange segment are rotated to be aligned in a radial and circumferential direction to said second closed path, providing the apparatus with greater constructional simplicity.

Preferably, wherein each tray-like element comprises a respective, independent lifting mechanism, whereby, in said exchange segment, the tray-like element is translated approaching to the gripping devices, thereby ensuring a jolt-free transfer.

Preferably, the pincer devices comprise a rotary actuator provided to rotate about a vertical axis, i.e. perpendicular to the plane on which the respective transport path is located, with a movement that can be adjusted to facilitate the transfer of the articles from or to the pincer devices, to accompany the respective transferring or receiving element.

BRIEF DESCRIPTION OF THE DRAWINGS

The present invention will hereinafter be described according to a preferred embodiment thereof, which is provided for illustrative and non-limiting purposes with reference to the accompanying drawings in which.

DETAILED DESCRIPTION

Figure 1:
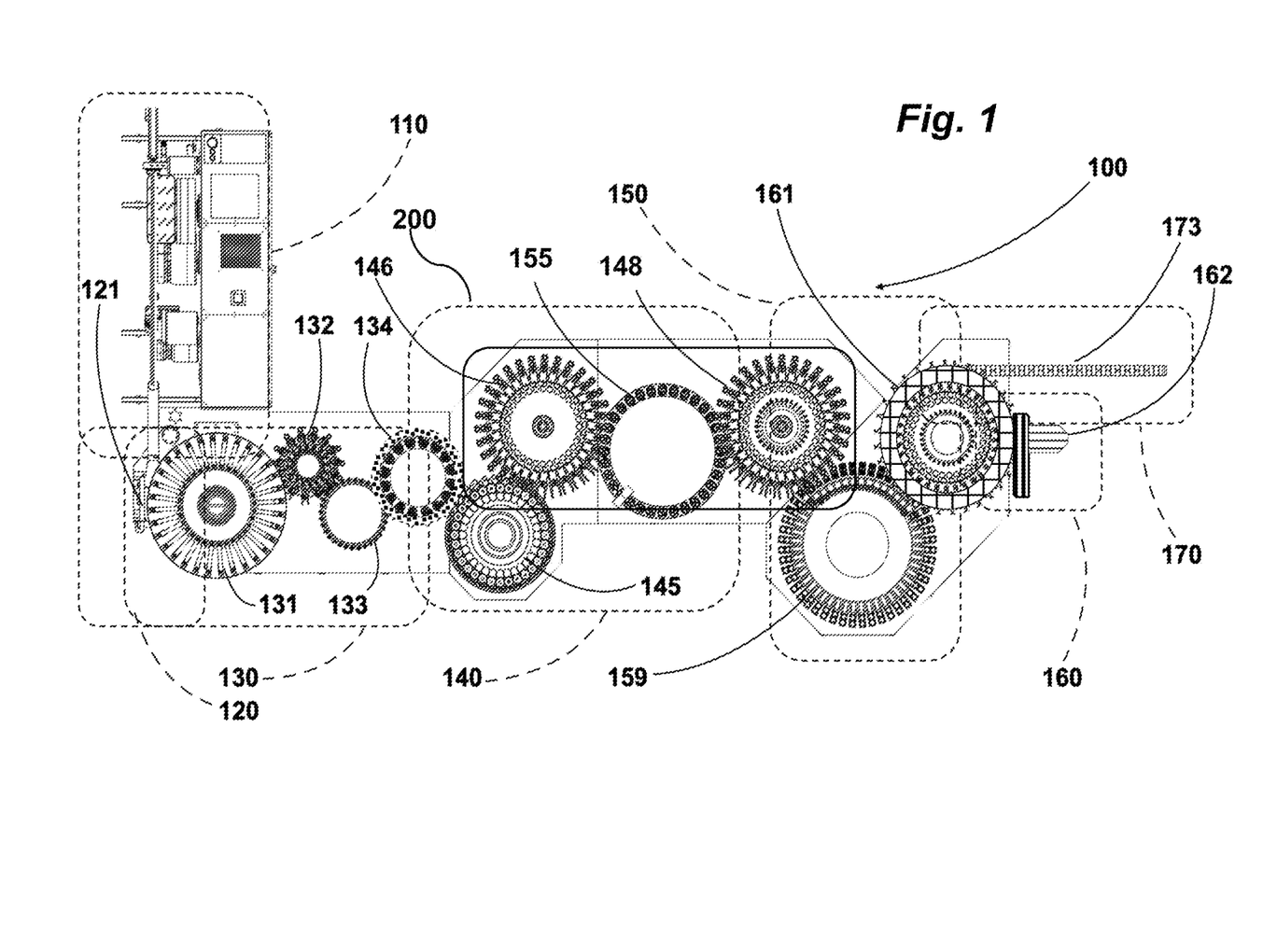
FIG. 1 shows a plan view of an embodiment of a packaging apparatus comprising a discrete element transfer device made according to the present invention.

With reference to the accompanying FIG. 1, a packaging apparatus for capsules for infusion type beverages, such as coffee is referred by 100, mentioned in the following for short as infusion type capsules.

These infusion type capsules are formed by a substantially rigid cup-shaped container, inside which a filter is arranged. During the subsequent packaging steps, a preparation based on coffee powder is added to the infusion type capsules, and then the capsules are sealed with the application of a lid and sent to a subsequent apparatus where they are boxed for distribution and sale.

In general, the cup-shaped containers are supplied by a feeding station 110, from which they proceed in a line with a continuous motion after being extracted from a set of cup-shaped containers provided by a supplier.

The packaging apparatus 100 comprises a release station 120 of discrete elements, which will be indicated in the following figures by 1, which in the present example comprise flat discs of a material suitable for forming a filter for infusion type products, in particular beverages.

Thus, the release station 120 comprises a release device 121 which in the present example is a device for cutting said discs from a continuous strip of filter material.

The packaging apparatus therefore comprises a filter forming station, indicated by 130, which comprises a carousel type device for producing 131 infusion type capsules 10.

The production device 131 is part of a more complex station, in which said discrete elements 1, once transferred from the release device 121 to the transport device 131, undergo a process for forming the filter, which is then inserted inside the target cup-shaped container, which may possibly contain on its bottom a spacer element inserted inside it in the feeding station 110.

At the end of the step of inserting the filter into the respective cup-shaped container, the filter is fixed, for example by welding, to the internal walls of the cup-shaped container, thus forming the infusion type capsule.

In this regard, the production device 131 transfers the cup-shaped containers with the filters to a first transfer device 132, of the carousel type, and from this they pass to a filter fixing wheel 133, to pass to a second transfer device 134, also of the carousel type, which transfers the capsules 10 to a filling station 140, in which they are filled with a predetermined dose of coffee powder.

In this regard, the filling station comprises a carousel-like filling device 145, from which the capsules 10 are transferred, by means of a first transfer wheel 146, or inlet wheel, to a carousel-like weighing apparatus 155, which performs a check on the amount of powder supplied to each capsule.

The weighing apparatus therefore comprises a second transfer wheel 147 and a weighing device 156, through which the capsules 10 pass in a single line and in a continuous flow.

Upon exit from the weighing device 156, the capsules 10 are transferred by a third transfer wheel 148 to a sealing station 150. The apparatus 100 thus comprises a cutting station 160 for lids that are obtained from a continuous strip by a cutting device 162.

The lids, which are disc-shaped, are transferred, by means of a third transfer device 161, to a sealing device 159, both like a carousel, which receives the infusion type capsules to be sealed from said third wheel 148 and which provides for the extraction of the gases from the capsule and the sealing thereof by applying on the upper opening thereof a disc-shaped lid obtained from continuous strip.

The three transfer wheels 146, 147 and 148 constitute, in the present embodiment, a transfer apparatus indicated as a whole with 200.

Furthermore, the first and third transfer wheels 146, 148, which operate as the inlet wheel and the outlet wheel of the transfer apparatus respectively, are structurally and/or functionally the same as each other and constitute a first transfer device in the transfer apparatus 200.

Thus, the second transfer wheel 147, is an intermediate wheel, on which any additional device operating on the articles while they are being transferred, in this case the weighing of single capsules, can generally be arranged. The second transfer wheel constitutes a second transfer device of the transfer apparatus 200.

It is understood that the first and second transfer devices can also take on other forms to create a closed transport system that in turn defines a respective closed transport path.

Once sealed, the capsules are delivered to said third transport wheel 161 which sends them to an outlet station 170, provided with a linear transport device 173.

Figure 2:
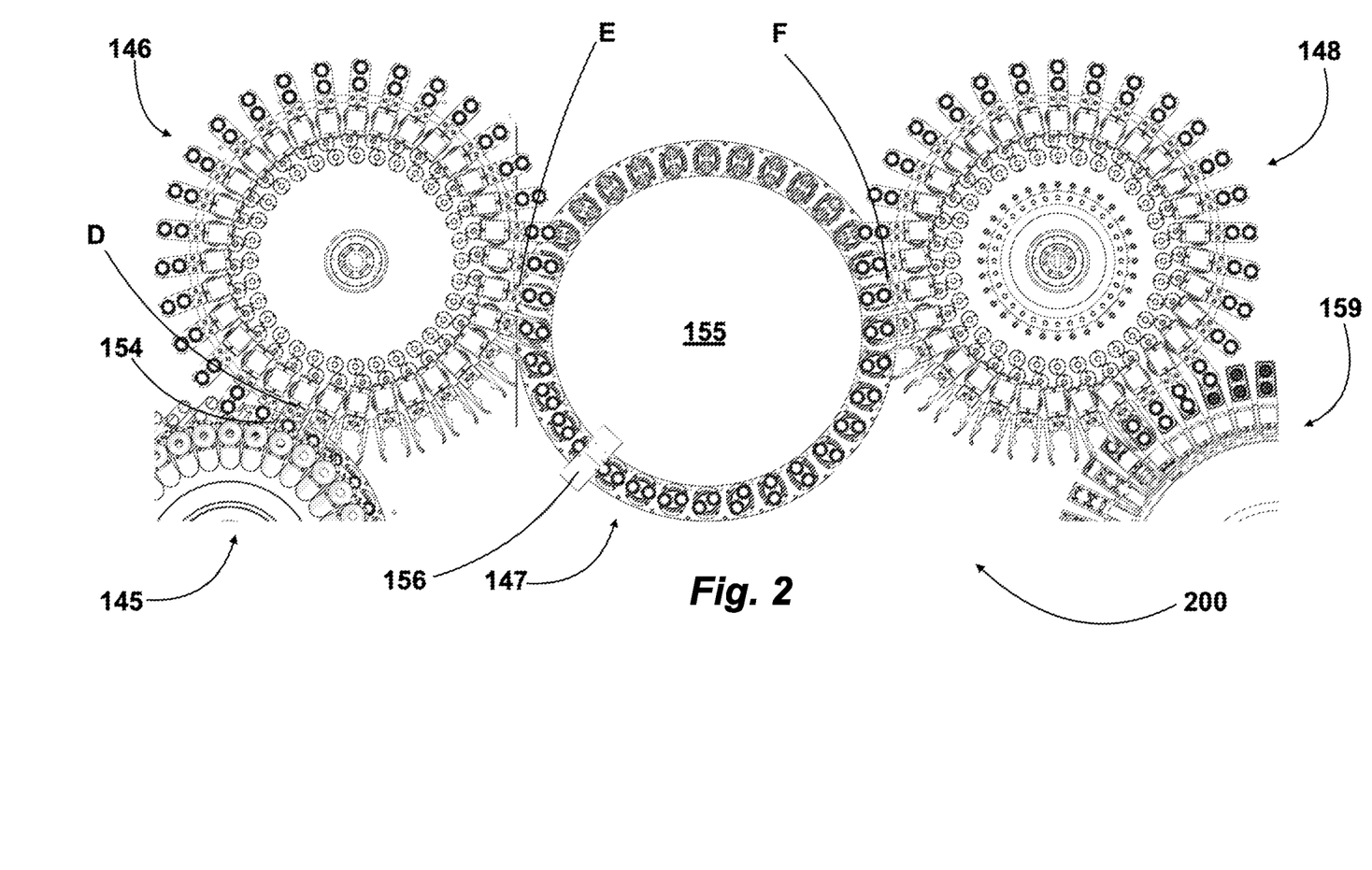
FIG. 2 shows a plan view from above of a transfer apparatus made according to the present invention.

With reference to FIG. 2 onwards, as mentioned above, the transfer apparatus 200 is formed by a sequence of transfer devices comprising respective transfer wheels, of which the first wheel 146 comprises a respective first drum rotating about a first vertical axis A; in this example, the rotation of the first drum is clockwise in a horizontal plane.

A plurality of first gripping devices 1 are positioned on the periphery of the first rotary drum, which are then transported along a first closed transport path, in particular circular in shape, wherein they receive capsules 10 from the transport system associated with the carousel-like filling device 145, which comprises a plurality of transport elements that are movable along a respective transport path, on which respective capsules 10 are received in a supporting manner on two concentric lines, at least in a release segment 154 wherein the capsules 10 are gripped by the first gripping devices 1.

The first gripping devices 1, which will be described below in greater detail, thus grip as many articles 1 as the lines of capsules 10 that are in said release segment 154. In the present example, as there are two lines, two capsules 10 are gripped in one operation, but they could be one, three or more.

The capsules 10 are transported along a first circular arc path extending from a first inlet end D to a first outlet end E and intersecting a second closed transport path formed on the second transfer wheel 147.

The first inlet end D defines, on the closed transport path of the first gripping devices 1, a gripping or grasping segment, i.e. an exchange segment with the previous transport system.

The first outlet end E coincides with the second inlet end of a second circular arc path belonging to the second closed transport path, which ends with a second outlet end F.

The first outlet end E defines, on the closed transport path of the first gripping devices 1, a release segment, i.e. an exchange segment with the previous transport system.

Figure 4:
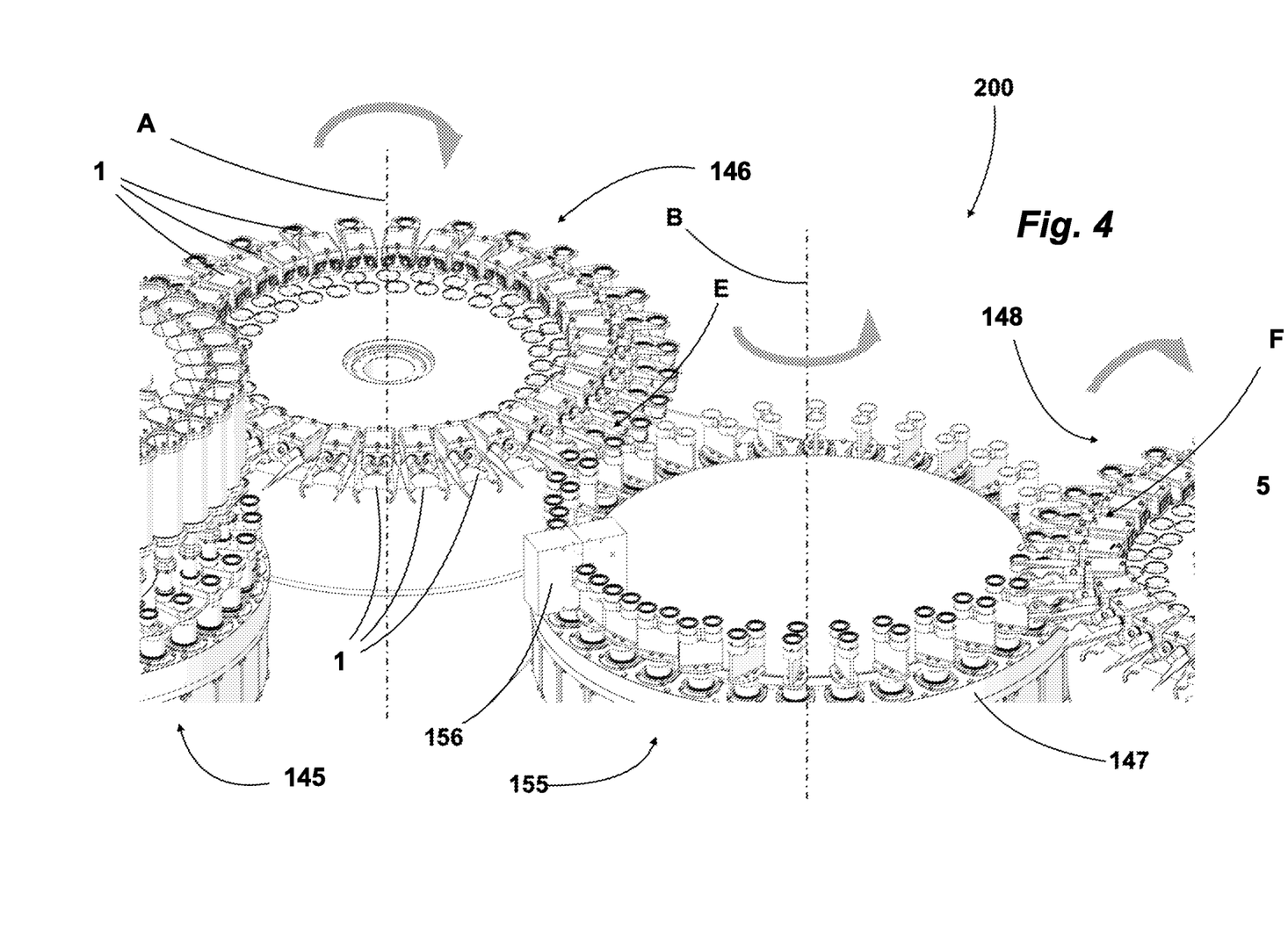
FIG. 4 shows a partial perspective view of the transfer apparatus in FIG. 2, from a second angle.

The second transfer wheel 147 is also of the carousel type and comprises a second rotary drum with a vertical rotation axis B (FIG. 4).

The second closed transport path concerns a plurality of a plurality of tray-like elements 2, apt to receive, in a supporting manner, respective capsules 10; the tray-like elements 2 are arranged on the periphery of the second rotary drum which rotates, in this embodiment, counter-clockwise, i.e., in the opposite direction with respect to the first transfer wheel 146.

The second inlet end defines, on the closed transport path of the tray-like elements 2, a gripping segment, i.e. an exchange segment with the previous transport system.

At the same time, the second outlet end F defines, on the closed transport path of the tray-like elements 2, a release segment, i.e. an exchange segment with the previous transport system, and so on.

In the present embodiment, the tray-like elements 2 comprise a number of seats, each apt to receive in a supporting manner a capsule 10 in an upright position, which is equal to the number of capsules 10 transported by the first gripping device, i.e. two in the present example.

Said seats are defined by respective recesses 3 that receive the bottom of a single capsule, thus keeping it in an upright position during its movement in a predetermined position.

Each tray-like element 2 is mounted on a respective rotary moving element 4, which has a stem 6 capable of rotating about a vertical axis Y, i.e. perpendicular to the rotation plane on which said second closed transport path is located, and of translating vertically, as explained in more detail below.

In this embodiment, the rotation of the tray-like element 4 is anti-clockwise, i.e. equally oriented with respect to the rotation of the second transfer wheel 147 about its respective axis B.

In this way, the recesses 3 of each tray-like element 2, keep the capsules 10 in a vertical position while the rotary moving elements 4 can be rotated from a first position R (FIG. 6) in which the recesses 3, and therefore the capsules 10, are arranged along a line that is aligned to a radial direction with respect to the second transport wheel 147, or more generally aligned in a direction substantially perpendicular to the second closed transport path, to a second position P (FIG. 5) in which the recesses 3, and therefore the capsules 10, are arranged along a line that is aligned to a circumferential direction with respect to the second transport wheel 147, or more generally aligned in a direction substantially parallel or tangential to said second closed transport path, and vice versa.

Therefore, the tray-like elements 2 will receive the capsules 10 from the first gripping devices 1 since they are in said first position R, and then subsequently rotate to said second position P.

Figure 3:
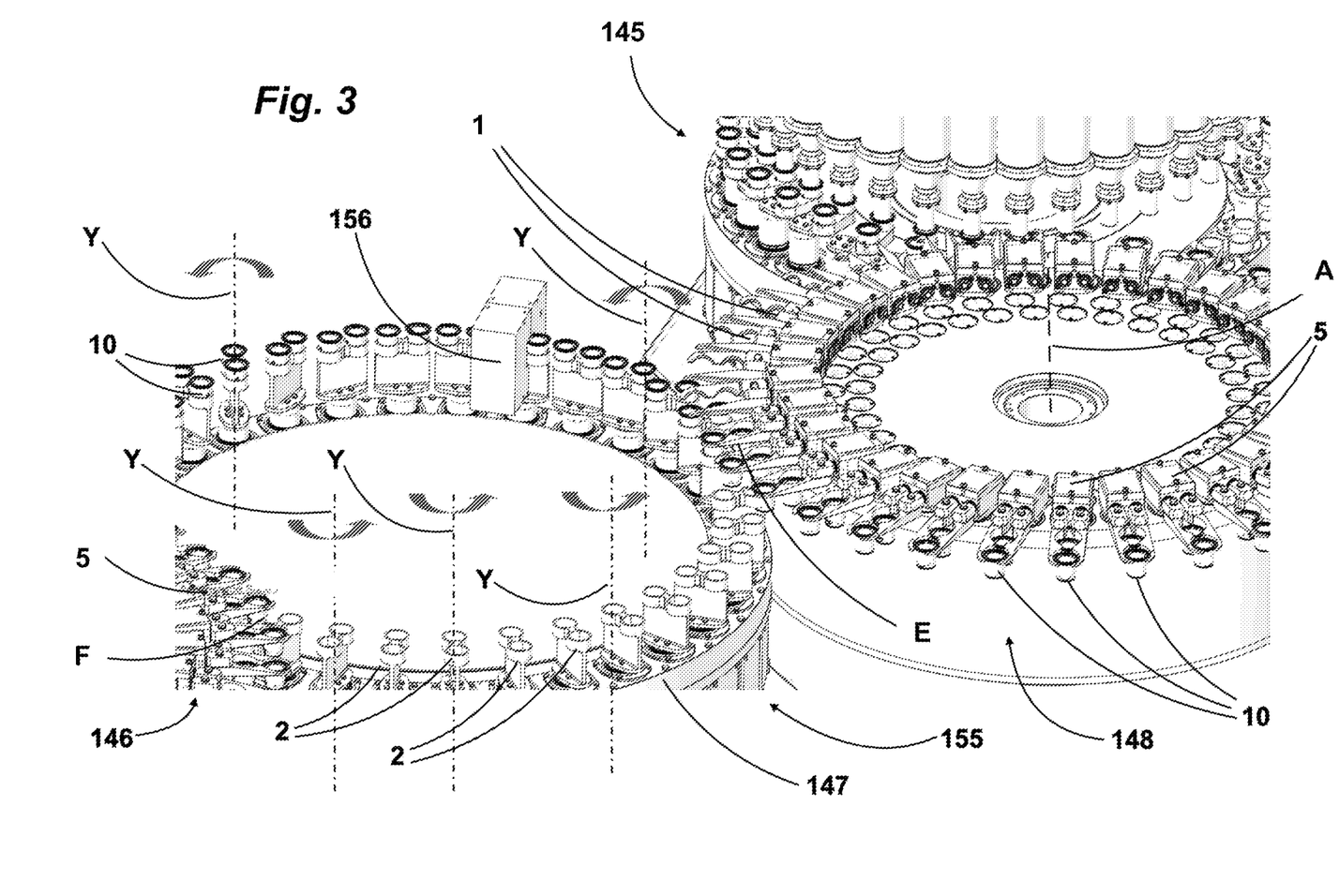
FIG. 3 shows a partial perspective view of the transfer apparatus in FIG. 2, from a first angle.

In this way, the capsules pass through the weighing device 156 in a single line corresponding to the peripheral circumference of the second transfer wheel 147 (FIGS. 2 to 4).

Once having passed through said weighing device 156, the rotary moving elements 4 will rotate again, i.e. in the present example they will continue in their rotation, bringing the tray-like elements 2 and the respective capsules 10 back to said first position R at the opposite second outlet end F (FIG. 5) of the second arc-shaped transport path of the second transfer wheel 147.

Figure 5:
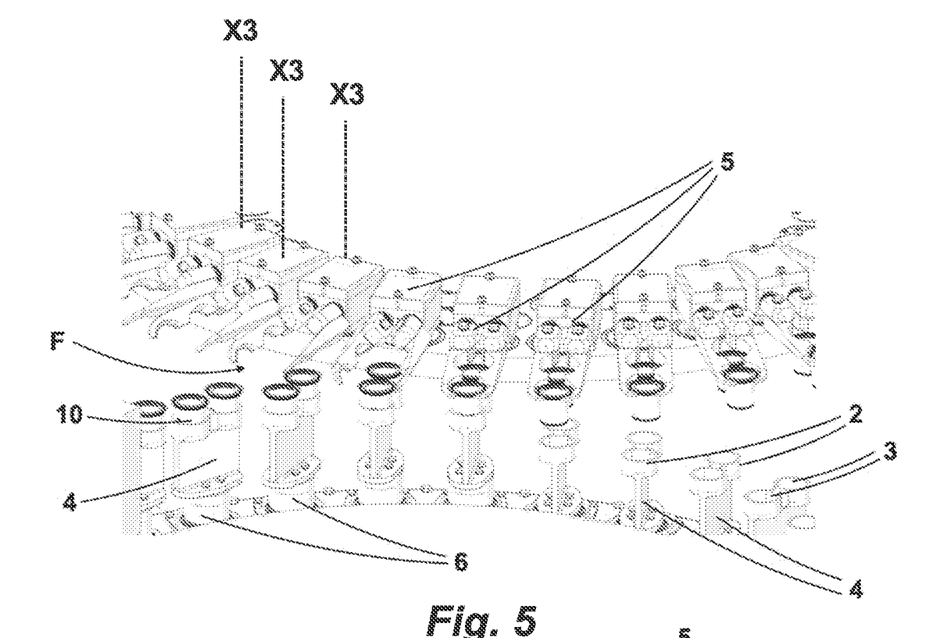
FIG. 5 shows a perspective view of a first detail of the transfer apparatus in FIG. 2.
Figure 6:
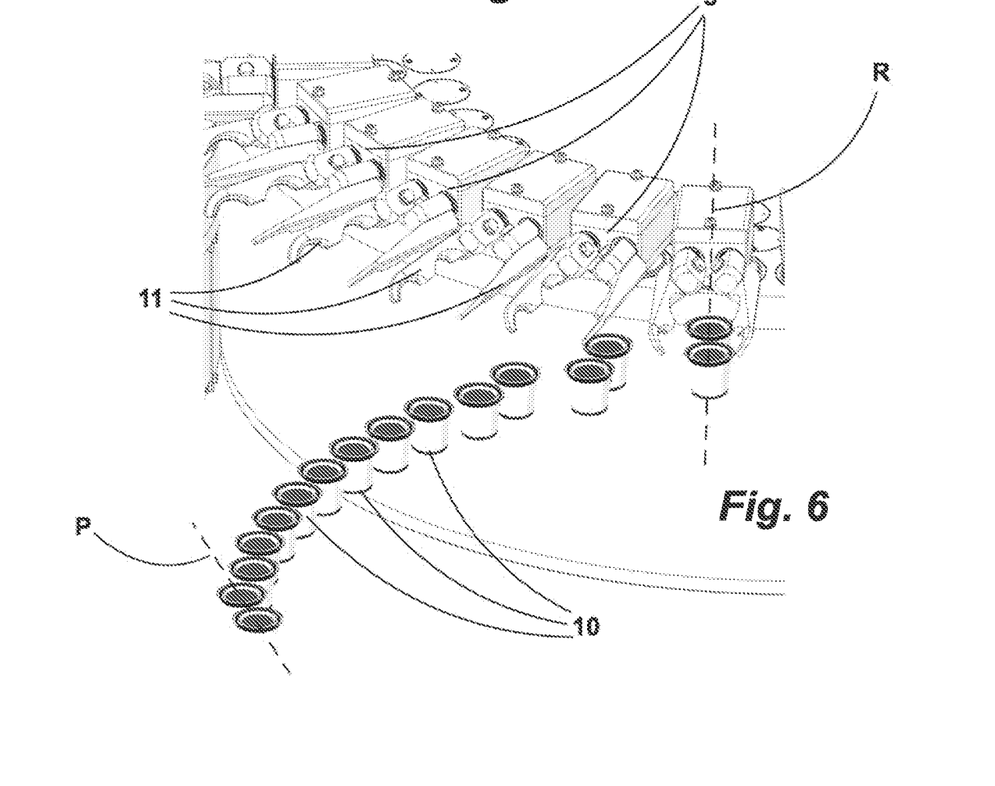
FIG. 6 shows a perspective view of a second detail of the transfer apparatus in FIG. 2.

At this end F, the second closed transport path intersects a third closed transport path which is associated with said third transfer wheel 148, which, like the first transfer wheel 146, comprises a respective third rotary drum on the periphery of which a plurality of second gripping devices 5 are positioned, which are then transported along the third closed transport path of circular shape, wherein they receive the capsules 10 from the second closed transport system associated with the second transfer wheel 147.

Each second gripping device 5 is therefore arranged to grip the capsules 10 on the tray-like elements 2 which, being in said first position R, shows the capsules 10 arranged in two substantially concentric lines.

Therefore, each second gripping device 5 grasps two capsules 10 at a time.

Each tray-like element 2 comprises a respective, independent lifting mechanism comprising said stem 6 and an actuating device, arranged internally to the second rotary drum.

The actuating device may for example consist of an electric motor, rotary or linear, which raises and lowers the tray-like element 2 according to instructions linked to the rotation of the drum, i.e. a so-called electronic cam.

However, it is understood that an entirely mechanical solution is also possible, with the lower end of each stem 6 acting as a cam follower, in contact with a fixed cam arranged within the second rotary drum.

The lifting mechanism described herein operates at the exchange segments, which extend along the second closed transport path of the tray-like elements 2, over a certain circular arc before and after the inlet and outlet ends E and F.

In the aforesaid exchange segment, therefore, not only the tray-like element 2 is rotated so as to assume said first radial position R, but it is translated approaching the pincer devices 1, 5 of the first and third transfer wheel 146, 148, at a gripping level.

When, on the other hand, the tray-like elements 2 are not in said exchange segments, and in particular when they are rotated to assume said second circumferential position P, they are translated to a weighing level, so that the crossing of the weighing device 156 occurs with the capsules all at the same level, which is determined by the fact that the capsules 10 are resting in the respective recess 3 of the tray-like element 2.

Said translation may comprise lifting to the gripping level and lowering to the weighing level, or vice versa.

The gripping device, in particular of the pincer type, will be described below with reference to FIG. 8, which shows the first gripping device 1, but the same description also applies to the second pincer device 5, which is structurally and functionally identical thereto.

It has a pair of gripping claws 11 that project outward in a substantially radial direction, with respect to the respective circular transport path, from the respective drum of the transfer wheel 146.

The gripping claws 11 cooperate with each other for gripping and releasing the capsules 10, in pairs in the present embodiment. Each gripping claw 11 comprises a proximal end 12 and a distal end 13, a gripping edge 14 facing the gripping edge 14 of the other claw 11, and a longitudinal development according to a predefined respective direction X1, so that the predefined directions X1 of both claws 11 define a gripping plane.

The pincer device 1 further comprises a driving mechanism comprising at least one rotary actuator, connected to a respective proximal end, arranged internally to a casing 20 from which said gripping claws 11 branch out frontally; the casing is arranged on the periphery of the transfer wheel 146.

The rotary actuator is provided to rotate each gripping claw 11 from a gripping position to a release position by rotating it about a respective rotation axis X2, as will be explained in more detail below.

Figure 8:
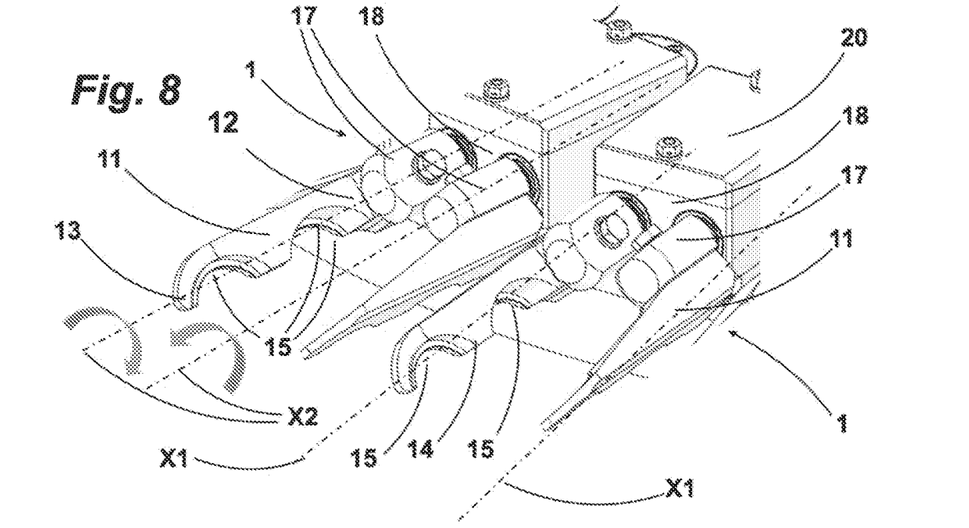
FIG. 8 shows a perspective view of a pair of pincer devices of the transfer apparatus of FIG. 2, made according to the present invention.

Preferably, the rotation axes X2 define a respective rotation plane (FIG. 8).

It should be noted that the gripping plane of the gripping claws 11 and the rotation plane determined by their rotation are substantially parallel or coincident based on the position of the gripping claws 11 which, as they rotate, rise and are lowered.

In the gripping position, the gripping edges 14 of the two gripping claws 11 of the pincer device 1 have a minimum spacing between them which increases by rotating the gripping claws 11 outwards, in two opposite directions of rotation, away from each other until said release position is reached.

Note that, in the present example, the rotation axes X2 are substantially parallel to each other.

In the present example, each gripping claw 11 rotates in such a way as to shift downwards, so that, in the released position, the two claws are in a cutting position with respect to the rotation plane.

The rotary actuator comprises, for each gripping claw 11, a rotary pin 17 projecting from a front wall 18 of said casing 20.

Each rotary pin defines a respective rotation axis X2 (FIG. 8), which extends in a direction that is concordant with the predefined direction of development X1 of the claws 11.

Thus, each claw 11 does not rotate about an axis perpendicular to the plane on which they are located, i.e. about a rotation pin that is perpendicular to their development, as happens in a classic jaw pincer configuration.

Instead, each claw 11 rotates about a longitudinal axis with respect to the extension of the claws 11.

In particular, the direction of longitudinal development X1 and the rotation axis X2 are substantially parallel, or diverge by a minimum angle, i.e. such that, when the two claws 11 are raised and approached in the gripping position, they are at the minimum mutual spacing, which increases progressively as the claws 11 are rotated substantially about themselves.

Each pin 17 can be connected to any type of drive of the rotary actuator. For example, the casing 20 may contain an electric motor that is electronically controlled so as to precisely determine the gripping and release positions and the respective rotations. A single motor can be provided to drive the rotation of both claws 11 or two separate motors can be provided.

Otherwise, there may be a control kinematic mechanism associated with the rotation of the rotary drum of the respective transfer wheel, which may comprise a cam drive through rods that are connected to a shaft driving the rotating pin 17.

Otherwise, the transfer device 200 may comprise, for each transfer wheel 146, 148, a dedicated motor, on board the respective rotary drum, which presides over the correct rotation of the gripping claws 11.

Figure 7:
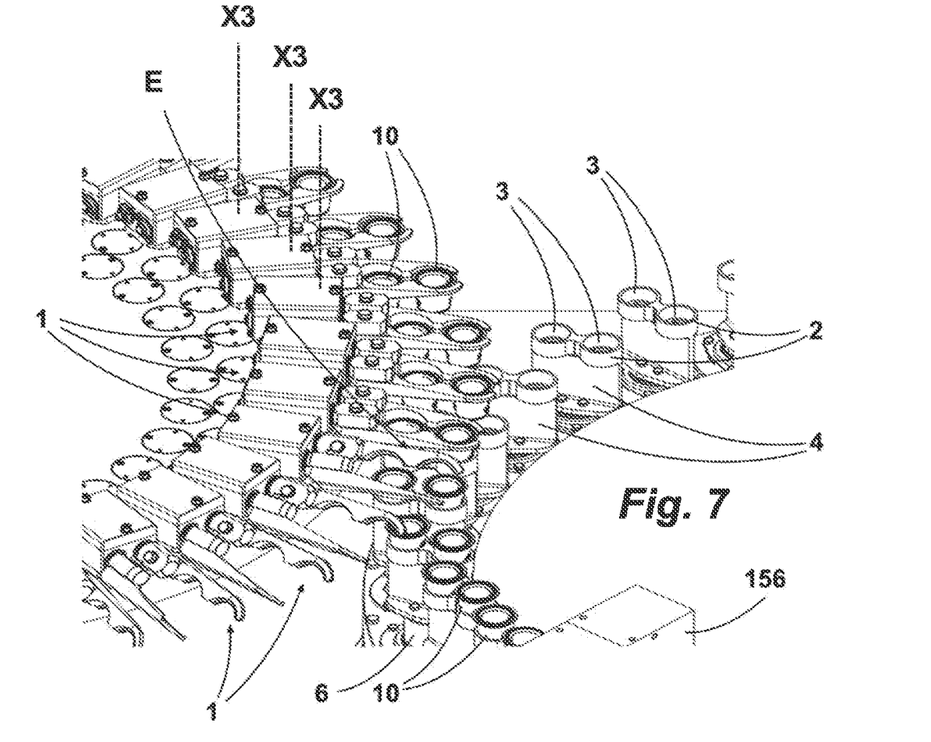
FIG. 7 shows a perspective view of a third detail of the transfer apparatus of FIG. 2.

The rotary actuator of the first or second pincer device 1, 5 is further provided to rotate it about a vertical axis X3 (FIGS. 5 and 7), i.e. perpendicular to the plane on which the respective transport path is located, with a movement that can be adjusted to ease the transfer of the capsules 10 from the first pincer devices 1 or the second pincer devices 5, to accompany the respective transferring or receiving element.

This rotation can also be implemented by means of an electronic or mechanical cam, and possibly a dedicated motor.

Each gripping edge 14 has, in the present embodiment, a pair of recesses 15, apt to cooperate with the corresponding recesses of the gripping edge 14 of the claw 11 facing it to form, in said gripping position, a pair of gripping clamps that simultaneously grip and release two capsules 10.

It is understood that the number of recesses 15 depends on the number of articles that, in general, the pincer device 1 will have to grip, and therefore may be one or more.

In particular, each recess 15 has a curved profile that is apt to be connected to the shape of either the article or the articles to be gripped, in this case capsules 10, in a predetermined area.

It is understood, however, that the shape of the profile can be adapted to whatever shape is preferred to create a better grip with the article to be gripped and transferred into the transfer device.

The curved profile of this embodiment has an upper support edge, formed on the surface of the gripping claw 11 facing upwards in the gripping position, which is provided to cooperate in a supporting manner with a projection of the chasuble 10, for example a shoulder present on the upper edge of the capsule 10.

To the above-described the transfer apparatus for articles and relevant transfer process, a person skilled in the art may, in order to meet additional and contingent requirements, make numerous further modifications and variations, all of which are, however, within the scope of protection of the present invention as defined by the appended claims.

The invention claimed is:

1. A transfer apparatus for articles, comprising:
   at least one first transport device, having pincer grip devices, configured to move along a respective first closed path, each pincer grip device having pincer claws projecting outward from said first closed path, the pincer claws being movable from a gripping position, in which the pincer claws transport one or more articles, to a release position; and
   at least one second transport device, having tray-like elements configured to move along a respective second closed path and to receive respective articles to rest on said tray-like elements,
   wherein
   the first and second transport devices are configured to cooperate with each other at one or two exchange segments where the first closed path is superimposed on said second closed path, and where the articles transported by said pincer grip devices are laid on respective tray-like elements and/or removed therefrom, wherein each pincer grip device comprises:
a pair of mutually cooperating gripping claws, each having (i) a proximal end and a distal end, (ii) a gripping edge facing a gripping edge of the other gripping claw, and (iii) a longitudinal development following a predefined respective direction defining a gripping plane; and
a driving mechanism, comprising at least one rotary actuator, connected to a respective proximal end, being configured to rotate each gripping claw from a gripping position to a release position about a rotation axis,
wherein
the rotation axes and the predefined respective direction directions are substantially parallel to each other, and
the gripping edges have a spacing between them that is minimum in the gripping position and increases towards the release position.

2. The transfer apparatus according to claim 1, wherein said first closed path is a circular path.

3. The transfer apparatus according to claim 2, wherein:
said first transport device comprises a respective carousel-like transfer wheel comprising a first drum,
said pincer grip devices are arranged in a sequence on a periphery of the transfer wheel, and
said pincer claws project outward along a substantially radial direction with respect to the circular path.

4. The transfer apparatus according to claim 1, wherein said second closed path is a circular path.

5. The transfer apparatus according to claim 4, wherein:
said second transport device comprises a respective carousel-like transfer wheel comprising a second drum, and
said tray-like elements are arranged in a sequence on the periphery of said transfer wheel.

6. The transfer apparatus according to claim 1, wherein each gripping claw and a respective other gripping claw of the pair of mutually cooperating gripping claws are configured to rotate in a direction opposite to each other.

7. The transfer apparatus according to claim 6, wherein each gripping claw is configured to rotate by shifting downwards.

8. The transfer apparatus according to claim 1, wherein each pincer grip device is configured to grip and release two or more articles, arranged along a line projecting outward from the respective first closed path,
the tray-like elements comprise two or more corresponding seats, each configured to receive one article, and
said two or more seats, in the one or two exchange segments, are aligned and parallel to the articles on cooperating pincer grip devices.

9. The transfer apparatus according to claim 8, wherein:
the tray-like elements are mounted on a member rotating about a vertical axis, thereby aligning said two or more seats along a direction substantially perpendicular to the second closed path, said two or more seats being rotatable in a direction substantially parallel with or tangential to said second closed path.

10. The transfer apparatus according to claim 9, wherein:
said first transport device comprises a respective carousel-like transfer wheel comprising a first drum,
said pincer grip devices are arranged in a sequence on a periphery of the transfer wheel,
said pincer claws project outward along a substantially radial direction with respect to the circular path, and
the two or more seats of each tray-like element in said exchange segment are configured to be rotated to be aligned in a radial and circumferential direction to said second closed path.

11. The transfer apparatus according to claim 1, wherein the tray-like elements each have one or more recesses defining a respective support seat for one article in a predetermined position.

12. The transfer apparatus according to claim 1, wherein:
each tray-like element comprises a respective and independent lifting mechanism, and
in said one or two exchange segments, the tray-like element is configured to be translated towards the pincer grip devices.

13. A packaging apparatus, comprising at least one transfer apparatus according to claim 1.

14. A transfer process for articles, comprising:
providing at least one first transport device, having pincer grip devices, moving along a respective first closed path, each pincer grip device with respective pincer claws projecting outward said first closed path, the pincer claws being movable from a gripping position, in which the pincer claws transport one or more articles, to a release position;
providing at least one second transport device, having tray-like elements moving along a respective second closed path, configured to receive respective articles to rest on said tray-like elements;
having the first and second transport devices cooperate with each other at one or two exchange segments, where the first closed path is superimposed on said second closed path, and where the articles transported by said pincer grip devices are laid on respective tray-like elements and/or removed therefrom,
wherein each pincer grip device comprises:
a pair of mutually cooperating gripping claws, each having (i) a proximal end and a distal end, (ii) a gripping edge facing a gripping edge of the other gripping claw, and (iii) a longitudinal development following a predefined respective direction defining a gripping plane; and
a driving mechanism, comprising at least one rotary actuator, connected to a respective proximal end, being configured to rotate each gripping claw from a gripping position to a release position about a rotation axis,
wherein
the rotation axes and the predefined respective direction directions are substantially parallel to each other, and
the gripping edges have a spacing between them that is minimum in the gripping position and increases towards the release position.

* * * * *